US011448365B2

(12) United States Patent
Keestra et al.

(10) Patent No.: US 11,448,365 B2
(45) Date of Patent: Sep. 20, 2022

(54) PRESSURE VESSEL

(71) Applicant: DSM IP ASSETS B.V., Heerlen (NL)

(72) Inventors: Beert Jacobus Keestra, Echt (NL); Tim Leonardus Maria Vorage, Echt (NL); Godefridus Bernardus Wilhelmus Leonardus Ligthart, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 711 days.

(21) Appl. No.: 16/061,757

(22) PCT Filed: Dec. 2, 2016

(86) PCT No.: PCT/EP2016/079610
§ 371 (c)(1),
(2) Date: Jun. 13, 2018

(87) PCT Pub. No.: WO2017/102385
PCT Pub. Date: Jun. 22, 2017

(65) Prior Publication Data
US 2018/0363849 A1 Dec. 20, 2018

(30) Foreign Application Priority Data

Dec. 18, 2015 (EP) .................................... 15201431

(51) Int. Cl.
| F17C 1/16 | (2006.01) |
| F17C 1/02 | (2006.01) |
| B29C 70/32 | (2006.01) |
| B29C 53/58 | (2006.01) |
| B29C 70/44 | (2006.01) |
| B29C 70/16 | (2006.01) |
| B29C 53/82 | (2006.01) |
| B29K 77/00 | (2006.01) |
| B29K 101/12 | (2006.01) |
| B29L 31/00 | (2006.01) |

(52) U.S. Cl.
CPC ............... *F17C 1/16* (2013.01); *B29C 70/16* (2013.01); *B29C 70/32* (2013.01); *F17C 1/02* (2013.01); *B29C 53/581* (2013.01); *B29C 53/824* (2013.01); *B29C 70/446* (2013.01); *B29K 2077/00* (2013.01); *B29K 2101/12* (2013.01); *B29L 2031/7156* (2013.01); *F17C 2203/0604* (2013.01); *F17C 2203/0619* (2013.01); *F17C 2203/0663* (2013.01); *F17C 2203/0673* (2013.01); *F17C 2209/2163* (2013.01); *F17C 2221/011* (2013.01); *F17C 2221/014* (2013.01); *F17C 2221/031* (2013.01); *F17C 2221/035* (2013.01); *F17C 2223/0123* (2013.01); *F17C 2223/0153* (2013.01); *F17C 2223/036* (2013.01); *Y02E 60/32* (2013.01); *Y02P 20/141* (2015.11)

(58) Field of Classification Search
CPC ...... F17C 1/16; F17C 1/02; F17C 2203/0604; F17C 2203/0619; F17C 2203/0663; F17C 2203/0673; F17C 1/00; F17C 13/06; F17C 2205/0311; F17C 2221/012; F17C 2270/0178; F17C 2270/0184; B60K 15/0406; B60K 15/03006; B60K 2015/03019
USPC ........................................................ 220/590
See application file for complete search history.

(56) References Cited

U.S. PATENT DOCUMENTS

| 5,816,436 A | 10/1998 | Grosjean et al. |
| 2013/0105501 A1 | 5/2013 | Vanswijgenhoven et al. |
| 2013/0136890 A1* | 5/2013 | Maliszewski ......... B29C 48/345 428/113 |
| 2013/0172495 A1* | 7/2013 | Dullaert ................. C08G 69/26 525/432 |
| 2014/0034654 A1 | 2/2014 | Dullaert et al. |
| 2014/0170353 A1 | 6/2014 | Kreager et al. |

(Continued)

FOREIGN PATENT DOCUMENTS

| WO | WO 2012/002410 | 1/2012 |
| WO | 2014/040871 | 3/2014 |

OTHER PUBLICATIONS

International Search Report and Written Opinion of the ISA for PCT/EP2016/079610, dated Feb. 22, 2017, 5 pages.

(Continued)

*Primary Examiner* — J. Gregory Pickett
*Assistant Examiner* — Niki M Eloshway
(74) *Attorney, Agent, or Firm* — Nixon & Vanderhye P.C.

(57) ABSTRACT

This invention relates to a pressure vessel comprising a hollow body comprising endless fibers embedded in a thermoplastic polymer, in which the thermoplastic polymer comprises one or more polyamides containing one or more aliphatic monomeric units, wherein the one or more polyamides have a CH2-ratio of at least 5.5 and less than 10, calculated by ☐ identifying the number of different aliphatic monomeric units in the one or more polyamides; ☐ determining the number of CH2 groups per aliphatic monomeric unit for each of these different aliphatic monomeric units; ☐ calculating the sum of the so determined numbers of CH2 groups; ☐ dividing said sum by the number of different aliphatic monomeric units in the one or more polyamides; taking into account only the aliphatic monomeric units present in the one or more polyamides in an amount of at least 10 wt % with respect to the total weight of the one or more polyamides.

8 Claims, No Drawings

(56) References Cited

U.S. PATENT DOCUMENTS

2016/0130397 A1\* 5/2016 Clauss .................. C08G 69/28
    528/339
2016/0332514 A1\* 11/2016 Arold ............... B60K 15/03006
2017/0313820 A1\* 11/2017 Choi ................ B60K 15/03177

OTHER PUBLICATIONS

DSM "Automobile natural gas tanks take the pressure with composites in DSM high performance thermoplastics" Oct. 30, 2014, XP055261321, 3 pages.

\* cited by examiner

PRESSURE VESSEL

This application is the U.S. national phase of International Application No. PCT/EP2016/079610 filed Dec. 2, 2016, which designated the U.S. and claims priority to EP Patent Application No. 15201431.2 filed Dec. 18, 2015, the entire contents of each of which are hereby incorporated by reference.

This invention relates to pressure vessels as well as their production.

In automotive industry there is a tendency to replace metal tanks into plastic solutions in order to save weight. This has led to the development of so-called type IV tanks, in which the tanks are made of thermoplastic liner wrapped with thermoset composite. A disadvantage of these type IV tanks, is that they do cannot be recycled, and sometimes buckling is observed. This has led to the development of so-called type V tanks as disclosed in U.S. Pat. No. 5,816,436, in which a sheath consisting of a composite material of polyamide 12 and carbon fibers is used.

A problem with structures as disclosed in U.S. Pat. No. 5,816,436 is that these are still limited in permeation properties and do not exhibit enough structural integrity. Tanks comprising polyamide 6 on the other hand do not exhibit enough resistance against acids as well as salts. When employed as gas tank, either for hydrogen or compressed natural gas (CNG), the tank has to withstand stringent safety measures, such as a minimum burst pressure, leak tests, fatigue tests and bonfire tests.

The object of the present invention is to have a pressure vessel which has improved structural integrity, while exhibiting sufficient acid resistance and sufficient low permeation. This object has been met by a pressure vessel comprising a hollow body comprising endless fibers embedded in a thermoplastic matrix, in which the thermoplastic matrix comprises one or more polyamides containing one or more aliphatic monomeric units,
wherein the one or more polyamides have a CH2-ratio of at least 5.5 and less than 10, calculated by
   identifying the number of different aliphatic monomeric units in the one or more polyamides;
   determining the number of CH2 groups per aliphatic monomeric unit for each of these different aliphatic monomeric units;
   calculating the sum of the so determined numbers of CH2 groups;
   dividing said sum by the number of different aliphatic monomeric units in the one or more polyamides;
taking into account only the aliphatic monomeric units present in the one or more polyamides in an amount of at least 10 wt % with respect to the total weight of the one or more polyamides.

Surprisingly, the vessel according to the invention exhibits improved structural integrity, which allows it to be employed as hydrogen vessel or CNG vessel or a vessel for other gases in which safety is of utmost importance.

A pressure vessel, hereafter also referred to as vessel or thermoplastic composite pressure vessel, is herein understood to comprise a hollow body and at least one boss. A boss is known by a person skilled in the art and refers to the opening in which a closure is attached which allows flow of gas or fluid in and out the vessel. A boss is usually made of metal.

The hollow body usually has a cylindrical shape and a boss is placed at the end. Often, a vessel has two bosses at each end of the cylindrical shape. The shape of the hollow body is determined by the desired use and is usually cylindrical with a diameter of between 10 cm and 1.00 m. The length of a hollow body also depends on the end use and may for example be between 50 cm and up to lengths as large as 10 m. These higher lengths are usually employed for gas transport. For vessels in for example trucks the length is usually between 1.00 m and 3.00 m.

The pressure vessel comprises a hollow body comprising endless fiber embedded in a thermoplastic matrix.

The thermoplastic matrix comprises one or more polyamides containing one or more aliphatic monomeric units, wherein the one or more polyamides have a CH2-ratio of at least 5.5 and less than 10, calculated by
   identifying the number of different aliphatic monomeric units in the one or more polyamides;
   determining the number of CH2 groups per aliphatic monomeric unit for each of these different aliphatic monomeric units;
   calculating the sum of the so determined numbers of CH2 groups;
   dividing said sum by the number of different aliphatic monomeric units in the one or more polyamides;
taking into account only the aliphatic monomeric units present in the one or more polyamides in an amount of at least 10 wt % with respect to the total weight of the one or more polyamides.

With thermoplastic matrix is herein understood to comprise at least one or more polyamides, but may also comprise other thermoplastic polymers and optionally other additives. The matrix also may consist of one or more polyamides.

Endless fiber is herein understood to refer to at least one endless fiber, and may also refer to more fibers.

Preferably, the thermoplastic matrix comprises one or more polyamides containing monomeric units derived from aliphatic monomers in an amount of at least 50 wt %, more preferably at least 60 wt % and even more preferred at least 70 wt % with respect to the total weight of the thermoplastic matrix. The polyamide may contain minor amounts non-aliphatic monomeric units, such as for example derived from isophthalic acid (I), terephthalic acid (T), isophoronediamine. Preferably, non-aliphatic monomeric units are present in a weight percentage of at most 50 wt %, preferably at most 40 wt %, and more preferably at most 30 wt %, wherein weight percentage is with respect to the total weight of the one or more polyamides. The CH2-ratio is calculated by
   identifying the number of different aliphatic monomeric units in the one or more polyamides;
   determining the number of CH2 groups per aliphatic monomeric unit for each of these different aliphatic monomeric units;
   calculating the sum of the so determined numbers of CH2 groups;
   dividing said sum by the number of different aliphatic monomeric units in the one or more polyamides;
taking into account only the aliphatic monomeric units present in the one or more polyamides in an amount of at least 10 wt % with respect to the total weight of the one or more polyamides.

Monomeric units derived from aliphatic monomers which are present in the one or more polyamides in an amount of less than 10 wt % are not taken into account for the CH2-ratio, as these are considered not to contribute towards structural integrity of the vessel. Non-aliphatic monomeric units are also not taken into account for determining the CH2-ratio.

For convenience, in table 1 a list is provided of common polyamides and their CH2-ratio.

TABLE 1

Polyamides and their CH2-ratio

| Name of polyamide | Sum of CH2 groups in aliphatic monomeric units >10 wt % in the one or more polyamides | number of different aliphatic monomeric units | CH2 ratio |
|---|---|---|---|
| PA-6 | 5 | 1 | 5 |
| PA-66 | 6 + 4 | 2 | 5 |
| PA-410 | 4 + 8 | 2 | 6 |
| PA-610 | 6 + 8 | 2 | 7 |
| PA-510 | 5 + 8 | 2 | 6.5 |
| PA-612 | 6 + 10 | 2 | 8 |
| PA-6T | 6 | 1 | 6 |
| PA-9T | 9 | 1 | 9 |
| PA-10T | 10 | 1 | 10 |
| PA-11 | 10 | 1 | 10 |
| PA-12 | 11 | 1 | 11 |
| PA-612/9T, in which 9T is present in an amount of less than 10 wt % | 6 + 10 | 2 | 8 |
| PA-612/9T, in which 9T is present in an amount of more than 10 wt % | 6 + 10 + 9 | 3 | 8.3 |
| PA-410/PA-6 50/50 wt % blend | 4 + 8 + 5 | 3 | 5.7 |
| PA-410/PA-6 95/5 wt % blend | 4 + 8 | 2 | 6 |

The polyamides are noted as described in Nylon Plastics Handbook, Melvin I. Kohan, Hanser Publishers, 1995, page 5. PA-6 is polycaprolactam, in which the monomeric units are derived from caprolactam. PA-66 is poly(hexamethylene adipamide) in which the monomeric units are derived from hexamethylene diamine and adipic acid.

PA-6/PA-66 refers to a blend of PA-6 and PA-66, whereas PA-6/66 refers to a copolyamide. PA-410 is a polyamide in which the monomeric units are derived from 1,4-diaminobutane and sebacic acid.

The amount and type of monomeric units may be determined by NMR spectroscopy.

For determining a monomeric unit, the weight of a monomeric unit is defined for a monomeric unit derived from a diamine as the part —NH—X—NH— in which X denotes the part between the diamine groups. The weight of a monomeric unit derived from a diacid is the part —C(O)—X—C(O)—, in which X denotes the part between the acid groups. For a monomeric unit derived from an amino acid or a lactam, the monomeric unit is defined as —NH—X—C(O)—, wherein X denotes the part between the amine and acid group. The split between the monomeric units is thus always a the C—N bond of the amide group.

The upper limit of the CH2-ratio is less than 10, as this provides additional stiffness as compared to polyamides having a higher CH2-ratio. Preferably, the CH2-ratio is between 5.6 and 9.5 and more preferably between 5.7 and 8.5, as these polyamides provide the optimum of properties including barrier properties and structural integrity and acid resistance.

Suitable polyamides having a CH2-ratio of at least 5.5 and less than 10 include PA-410, PA-510, PA-412, PA-512, PA-610, PA-612, PA-1010, as well as blends and copolyamides thereof.

Preferably, the one or more polyamides having a CH2-ratio of at least 5.5 comprises PA-410, as tapes comprising PA-410 show a higher modulus and higher strength and thus allowing for thinner walls, weight reduction or stronger tanks at same weight. This results in a higher safety standard when employed in tanks. Preferably, the pressure vessel thus a hollow body comprising endless fibers embedded in a thermoplastic matrix, in which the thermoplastic matrix comprises at least 50 wt % of PA-410 with respect to the total amount of thermoplastic matrix, more preferably at least 60 wt % and even more preferred at least 70 wt % PA-410.

Endless Fiber

The hollow body in the vessel according to the invention comprises endless fiber. Endless fiber as such is known in the art and is also referred to as continuous fiber and is herein understood to have an aspect ratio of at least 500. For example, the endless fiber in the vessel may have a length of several hundreds of metres.

The endless fiber present in the hollow body may be chosen from the group consisting of glass fiber, carbon fiber, aramid fiber, and combinations thereof. Preferably, the endless fiber has a sizing in order to improve adhesion between the fiber and the polyamide. Sizings are known to a person skilled in the art.

The volume % of the endless fiber in the hollow body usually lies between 10 and 65 volume % as compared to the total volume of the endless fiber and thermoplastic matrix of the hollow body, preferably the volume percentage is between 20 and 55 vol %, more preferably the volume percentage is between 30 and 55 vol %. It is usually desirable to have a volume percentage of endless fiber as high as possible, as this contributes to the strength of the vessel.

In a preferred embodiment, the hollow body comprises between 20 and 55 vol % of endless fibers chosen from the group of carbon fiber and glass fiber and combinations thereof with respect to the total volume of the endless fiber and thermoplastic matrix of the hollow body and a thermoplastic matrix comprising at least 50 wt % of PA-410 with respect to the total weight of thermoplastic matrix, more preferably at least 60 wt % and even more preferred at least 70 wt % PA-410.

Other Ingredients

The thermoplastic matrix optionally comprises any of the following ingredients such as heat stabilizer, flame retardant, colorant, lubricant, mold release agent, UV stabilizer, impact modifier, nucleating agent, nigrosine, laser absorbing additives and combinations thereof. These ingredients are known to a person skilled in the art and are usually present in minor amounts such as for example between 0.001 wt % and 10 wt % with respect to the total weight of the thermoplastic matrix.

Preferably, the thermoplastic matrix comprises heat stabilizers, chosen from the group of inorganic stabilizers, organic stabilizers comprising a primary antioxidant group, organic stabilizers comprising a hindered amine group and combinations thereof. Preferably, the heat stabilizers are present in an amount of between 0.01 wt % and 8 wt % with respect to the total weight of the thermoplastic matrix. Inorganic stabilizers are known and are for example a copper compound and a salt containing a halogenide acid group, for example an iodide or a bromide salt. Good examples of suitable copper compounds include copper (I) halogenides, preferably copper iodide (CuI) and further copper salts like for instance copper acetate, copper sulfate and cupper stearate. As the salt containing an halogenide acid group preferably potassium bromide (KBr) of potassium iodide (KI) are used. Most preferred a combination of copper iodide and potassium bromide (CuI/KBr) is used. Organic stabilizers comprising a primary antioxidant group are radical scavengers such as for example phenolic antioxidants as well as aromatic amines, and are known as such. Suitable organic stabilisers comprising a hindered amine (also known as Hindered Amine Stabilizer; HAS) in the tape according to the invention are for example HAS compounds derived from a substituted piperidine compound, in particular any compound which is derived from an alkyl-substituted piperidinyl or piperazinone compound, and substituted alkoxy peridinyl compounds. More preferably, the thermoplastic matrix comprises a combination of heat stabilizer in which an inorganic stabilizer is employed in combination with an organic stabilizer comprising both a hindered amine group and an organic stabilizer comprising a primary antioxidant. The combination of these 3 stabilizers provides an improved UV stability.

In one embodiment, the vessel according to the invention comprises a liner. A liner is known to a person skilled in the art and is referred to as a non-structural part which may subsequently be covered by endless fiber embedded in a thermoplastic matrix, for example in the form of wrapping a tape. The liner may thus act as a support in a process for preparing a hollow body, but may also be prepared over a separate support. The liner intends to provide a barrier between the fluid or gas and the tape, preventing amongst others leaks and chemical degradation of the tape wrapped around a liner. In general, a protective shell is applied around a liner for protective shielding against impact damage. The liner may be prepared by a polymer comprising polyamide similar as the polyamides which are suitable for the thermoplastic composition, but the liner may also be prepared by polymers comprising dissimilar polyamide, such as for example polyamide-6 or polyamide-66 or blends thereof, as these polyamides are readily available. The liner may be prepared by polymers or compositions further comprising ingredients such as heat stabilizer, flame retardant, colorant, lubricant, mold release agent, UV stabilizer, impact modifier, nucleating agent, nigrosine, laser absorbing additives and combinations thereof.

The liner may be prepared by a composition disclosed in US20140034654, which is herein incorporated by reference. Preferably, the liner comprises a metal and/or a thermoplastic polymer chosen from the group of PA-6 or PA-66, PA-410, PA-6T/6I ethylene vinyl alcohol (EVOH) or a combination thereof.

The liner may be prepared by wrapping a tape which comprise at least one layer, but may also comprise more than one layer. These at least one layer may be for example EVOH or metal in order to improve the barrier performance. Optionally, a tie layer may be present in order to improve adhesion. The liner may be prepared by wrapping tapes as disclosed in US2013105501, as well as by blow molding, tube extrusion, injection molding and/or roto-molding. If tube extrusion is employed, the liner is usually prepared by welding domes to an extruded tube. The domes may be then prepared by injection molding. An advantage of a vessel according to the invention comprising a liner is that upon filling or unfilling a vessel with gas, the temperature changes during which less debuckling is observed. Buckling is known to a person skilled in the art and is the separation of the liner material and the endless fiber with thermoplastic polymer wrapping. The vessel according to the invention, surprisingly exhibits less buckling, which allows for longer life time of the tank, and reduced chance of ruptures in the liner. The vessel according to the invention may thus have a single layer, herein understood to be prepared by endless fiber and thermoplastic matrix only. The vessel also may have more than one layer, herein understood to have the layer of endless fiber and thermoplastic matrix and at least one further layer, such as for example a liner, as described above. An advantage of a single layer vessel is that recycling of the vessel is greatly facilitated.

The vessel according to the invention preferably comprises a hollow body which is made by employing tapes which comprise endless fibers embedded in a thermoplastic matrix. The invention thus also relates to a process for preparing a hollow body comprising the following steps:

a. Providing a support;
b. Providing endless fiber and providing thermoplastic matrix; or providing a tape comprising endless fiber and thermoplastic matrix;
c. Wrapping the endless fiber and thermoplastic matrix, or the tape around the support while consolidating the endless fiber and thermoplastic matrix or the tape by heat, thereby creating a hollow body;
d. Cooling the hollow body to become solid;

wherein the thermoplastic matrix comprises one or more polyamides containing one or more aliphatic monomeric units, wherein the one or more polyamides have a CH2-ratio of at least 5.5 and less than 10, calculated by
    identifying the number of different aliphatic monomeric units in the one or more polyamides;
    determining the number of CH2 groups per aliphatic monomeric unit for each of these different aliphatic monomeric units;
    calculating the sum of the so determined numbers of CH2 groups;
    dividing said sum by the number of different aliphatic monomeric units in the one or more polyamides;

taking into account only the aliphatic monomeric units present in the one or more polyamides in an amount of at least 10 wt % with respect to the total weight of the one or more polyamides.

With tape herein is understood an elongated body having a longitudinal direction, a width, a thickness and a cross-sectional aspect ratio, i.e. the ratio of thickness to width. Said cross-section is defined as substantially perpendicular to the longitudinal direction of the tape. The longitudinal direction or machine direction of the tape essentially corresponds to the orientation of the endless fibers. The length dimension of a tape is not particularly limited. The length may exceed 10 km and mainly depends on the endless fibres and the process used to produce the tape. Nevertheless said tape can for convenience reasons be manufactured to smaller sizes, according to the requirements of the envisioned applications.

Tape usually have a thickness of between 100 micrometer and 500 micrometer as thicker tapes are more difficult to wrap. Thinner tapes have the disadvantage that more wrapping is required to attain the hollow body.

By width is herein understood the largest dimension between two points on the perimeter of a cross-section of the tape, said cross-section being orthogonal to the length of the tape. By thickness is herein understood a distance between two points on the perimeter of said cross-section, said distance being perpendicular on the width of the tape. The width and the thickness of a tape can be measured according to known methods in the art, e.g. with the help of a ruler and a microscope or a micrometer, respectively.

The support may be a mandrel, as disclosed in the process of US2013105501, or a liner prepared by for example as disclosed above, inflatable balloon, inert filler such as sand or talcum. The support may thus become part of the hollow body or may be taken out after production of the hollow body.

Wrapping may be performed in the form of a tape which comprises the endless fiber and thermoplastic matrix, but wrapping may also be performed by endless fiber and thermoplastic matrix separately. Wrapping may be performed while keeping the support in one position or may also be performed by moving the support.

Optionally, before step c) another material may be wrapped and consolidated around the support for example to increase barrier properties to form a liner, as disclosed above. This material may comprise from for example EVOH, PA-6, PA-66, PA-410, PA-610, PA-612, metal or combinations thereof. This is in particular beneficial if the support will not become part of the vessel. The other material may then be employed to increase barrier properties. Preferably, the other material before step c) is chosen from PA-6, PA-410, as these materials have a good barrier performance and recyclability.

Consolidation is performed preferably by heat, such as provided by a laser, as for example an infrared laser, or heating elements such as an oven.

US2013105501 discloses a method in which a tape is wrapped over a support being a mandrel. After consolidation the mandrel is removed. US2013105501 is hereby incorporated by reference. The vessel may also be prepared by a so-called laser method, which is for example disclosed in WO14040871A1. If a laser method is employed, the tape comprising endless fiber embedded in a thermoplastic matrix may contain a laser absorbing additive in order to produce heat from the laser. Laser absorbing additives are known to a person skilled in the art and include for example carbon black. Other examples of laser light absorbers include oxides, hydroxides, sulphides, sulphates and phosphates of metals such as copper, coated bismuth, tin, aluminum, zinc, silver, titanium, antimony, manganese, iron, nickel and chromium, laser light absorbing (in)organic dyes or metal oxide coated flakes. Preferably the laser light absorbers are chosen from antimony trioxide, tin dioxide, barium titanate, titanium dioxide, aluminum oxide, copper-hydroxy-phosphate, copper-ortho-phosphate, copper-hydroxide, antimony-tin oxide, anthraquinone or azo dyes.

The vessel according to the invention may exhibit a burst pressure of at least 25 bar, which is usually required for vessels containing liquefied petroleum gas (LPG) or air or water, or nitrogen or oxygen. Surprisingly, the vessel may exhibit a burst pressure of at least 300 bar, which is for example required for vessels containing compressed natural gas (CNG). For hydrogen vessels a burst pressure of at least 1500 bar may be reached with a vessel according to the invention. Burst pressure is measured according to the hydrostatic pressure burst test as described in ECE R110.

Surprisingly, the vessel according to the invention may pass the Bonfire test.

EXAMPLES

Measurements were performed on various thermoplastic matrices in order to show their suitability for use in a thermoplastic composite pressure vessel. Various polyamides with various CH2-ratios were tested. Results are given in Table 2.

Acid resistance test: 15 Izod bars with the polyamides as described in Table 2, were exposed to a solution of 30% H2SO4 in a petri-dish. The level of liquid was 2 mm so that the 4 mm thick bars were immersed on one side only. Separate petri-dishes were used for every take-out time (25, 50 and 100 hrs). After immersion, the bars were washed with an excess of water taking care that the upper half did not come in contact with the strong acid. After washing, the bars were dried with paper. Flexural test according to ISO178: the acid treated surface faced downward during the flexural test (non-exposed side facing up-wards).

Table 2 clearly indicates that polyamides with a CH2-ratio between 5.5 and less than 10, exhibited a combination of high acid resistance and good structural integrity. A good structural integrity is observed when the flex modulus is sufficient high in combination with a higher HDT. Examples 1 to 4 all exhibited a sufficient high flex modulus in combination with a high HDT, which makes them good candidates to be employed in a vessel according to the invention.

The most preferred polyamide being PA-410, example 1, clearly combines a high flex modulus with high HDT, which surprisingly when employed in a vessel, showed a very strong and robust vessel.

A hollow body was prepared by wrapping a tape comprising PA-6. Subsequently a tape comprising 65 wt % endless glass fibers and 35 wt % PA-410 was wrapped, based on the total weight of the tape around a mandrel and using heat to consolidate these wrappings. The vessel was created by attaching bosses to the hollow body, as known in the prior art. The vessel was filled with natural gas and the vessel was subjected to the Bonfire test. This test is described in ECE R110. In short, during Bonfire test, a vessel while containing gas, is subjected to 850° C. at the outside of the vessel. A vessel passes the test if the vessel does not explode, but the vessel vents the contained gas through a pressure relief device. Surprisingly, the vessel produced with a thermoplastic matrix comprising one or more polyamides containing one or more aliphatic monomeric units, wherein the one or more polyamides have a CH2-ratio of at least 5.5 and less than 10 taking into account only the aliphatic monomeric units present in the one or more polyamides in an amount of at least 10 wt % with respect to the total weight of the one or more polyamides, passed the Bonfire test, even though the melting temperature of PA-410 is 248° C., thus substantially lower than the heat the vessel was subjected to. This is a major achievement as the vessel according to the invention allows for thermoplastic composite pressure vessels which can contain high amounts of gasses or liquids while maintaining a high safety standard and after the life time the vessel may be recycled into prime applications, which was not possible for thermoset tanks.

TABLE 2

Various polyamides and results

| | ISO | comparative example A PA-6 | comparative example B PA-66 | example 1 PA-410 | example 2 PA-610 | example 3 PA-612 | example 4 PA-1010 | comparative example C PA-11 | comparative example D PA-12 |
|---|---|---|---|---|---|---|---|---|---|
| CH2-ratio | | 5 | 5 | 6 | 7 | 8 | 9 | 10 | 11 |
| flex modulus (GPa) | ISO178 | 2.84 | 2.94 | 2.7 | 2.05 | 2.38 | 1.74 | | 1.31 |
| permeability CNG @25 C. (cm3.mm/m2/day/bar) | | 0.1 | | | | | | 0.6 | |
| permeability H2 @20° C. (mol/m/s/Pa) | | 1.1E−16 | | | | | | 6.7E−16 | |
| flex modulus after 100 hrs acid exposure (GPa) | | 0.84 | 0.88 | 2.02 | 1.35 | 1.89 | | | |
| retention after H2SO4 exposure (%) | | 29.8 | 29.9 | 74.5 | 65.9 | 79.2 | | | |
| HDT 0.45 MPa | ISO-R-75 method B | 150 | 215 | 175 | 140 | 135 | 110 | 145 | 135 |
| HDT 1.8 MPa | ISO-R-75 method A | 50 | 75 | 75 | 55 | 62 | 50 | 50 | 55 |
| Melting temperature (° C.) | | 222 | 262 | 248 | 222 | 218 | 202 | 189 | 179 |

The invention claimed is:

1. A pressure vessel comprising:
a hollow body comprising a thermoplastic matrix and 10 and 65 volume % of endless fibers, based on total volume of the endless fibers and the thermoplastic matrix of the hollow body, embedded in the thermoplastic matrix, wherein
the endless fibers are selected from the group consisting of glass fibers, carbon fibers and combinations thereof, and wherein
the thermoplastic matrix comprises one or more polyamides containing one or more aliphatic monomeric units, wherein the one or more polyamides are selected from the group consisting of PA610, PA612 as well as blends and copolyamides thereof, and wherein
the one or more polyamides have a CH2-ratio of at least 5.5 and less than 10, calculated by
  (i) identifying the number of different aliphatic monomeric units in the one or more polyamides;
  (ii) determining the number of CH2 groups per aliphatic monomeric unit for each of these different aliphatic monomeric units;
  (iii) calculating the sum of the so determined numbers of CH2 groups; and
  (iv) dividing said sum by the number of different aliphatic monomeric units in the one or more polyamides;
taking into account only the aliphatic monomeric units present in the one or more polyamides in an amount of at least 10 wt % with respect to the total weight of the one or more polyamides, and wherein
the pressure vessel has a burst pressure of at least 25 bar as measured according to the hydrostatic pressure burst test described in ECE R110.

2. The pressure vessel according to claim 1, further comprising a liner formed of a material comprising a metal and/or a thermoplastic polymer selected from the group consisting of PA-6, PA-66, PA-410, ethylene vinyl alcohol and combinations thereof.

3. The pressure vessel according to claim 1, wherein the CH2-ratio is between 5.6 and 9.5.

4. The pressure vessel according to claim 1, wherein burst pressure of the pressure vessel is at least 300 bar, as measured according to the hydrostatic pressure burst test described in ECE R110.

5. The pressure vessel according to claim 1, wherein the thermoplastic matrix comprises one or more polyamides containing monomeric units derived from aliphatic monomers in an amount of at least 60 wt % with respect to the total weight of the thermoplastic matrix.

6. The pressure vessel according to claim 1, wherein the thermoplastic matrix further comprises a heat stabilizer, a flame retardant and/or a colorant.

7. The pressure vessel according to claim 1, wherein the thermoplastic matrix comprises at least 60 wt % PA-410 with respect to the total weight of thermoplastic matrix, and wherein the hollow body comprises between 20 and 55 vol % of the endless fibers with respect to the total volume of the endless fibers and the thermoplastic matrix of the hollow body.

8. The pressure vessel according to claim 1, wherein the pressure vessel is a pressurized tank for compressed natural gas (CNG) tank or a pressurized tank for hydrogen gas.

* * * * *